(12) United States Patent  
Hermann et al.

(10) Patent No.: US 8,541,126 B2
(45) Date of Patent: Sep. 24, 2013

(54) THERMAL BARRIER STRUCTURE FOR CONTAINING THERMAL RUNAWAY PROPAGATION WITHIN A BATTERY PACK

(75) Inventors: Weston Arthur Hermann, Palo Alto, CA (US); Scott Ira Kohn, Redwood City, CA (US); Vineet Haresh Mehta, Mountain View, CA (US); David G. Beck, Tiburon, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 682 days.

(21) Appl. No.: 12/584,074

(22) Filed: Aug. 31, 2009

(65) Prior Publication Data

US 2010/0136404 A1    Jun. 3, 2010

(51) Int. Cl.
*H01M 10/50*    (2006.01)

(52) U.S. Cl.
USPC .............................. 429/120; 429/149; 429/152

(58) Field of Classification Search
USPC ........................................ 429/149, 152, 120
See application file for complete search history.

(56) References Cited

U.S. PATENT DOCUMENTS

| 6,933,076 B2 * | 8/2005 | Ura et al. ................. 429/164 |
| 2006/0164795 A1 * | 7/2006 | Jones et al. .................. 361/600 |
| 2008/0233470 A1 * | 9/2008 | Zhu et al. .................... 429/90 |

* cited by examiner

*Primary Examiner* — Jane Rhee
(74) *Attorney, Agent, or Firm* — Patent Law Office of David G. Beck

(57) ABSTRACT

A battery pack is provided that includes one or more thermal barrier elements, the thermal barrier elements dividing the cells within the battery pack into groups of cells. The thermal barrier elements that separate the cells into groups prevent a thermal runaway event initiated in one group of cells from propagating to the cells within a neighboring group of cells.

14 Claims, 7 Drawing Sheets

THERMAL BARRIER STRUCTURE FOR CONTAINING THERMAL RUNAWAY PROPAGATION WITHIN A BATTERY PACK

FIELD OF THE INVENTION

The present invention relates generally to batteries, and more particularly, to a means for containing the propagation of thermal runaway within a battery pack.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

During a thermal runaway event, a large amount of thermal energy is rapidly released, heating the entire cell up to a temperature of 900° C. or more. Due to the increased temperature of the cell undergoing thermal runaway, the temperature of adjacent cells within the battery pack will also increase. If the temperature of these adjacent cells is allowed to increase unimpeded, they may also enter into a state of thermal runaway, leading to a cascading effect where the initiation of thermal runaway within a single cell propagates throughout the entire battery pack. As a result, power from the battery pack is interrupted and the system employing the battery pack is more likely to incur extensive collateral damage due to the scale of thermal runaway and the associated release of thermal energy.

A number of approaches have been employed to either reduce the risk of thermal runaway, or reduce the risk of thermal runaway propagation. For example, by insulating the battery terminals and using specifically designed battery storage containers, the risk of shorting during storage and/or handling can be reduced. Another approach is to develop new cell chemistries and/or modify existing cell chemistries. Yet another approach, disclosed in co-pending U.S. patent applications Ser. Nos. 12/504,712, 12/460,372, 12/460,342, 12/460,423 and 12/460,346, is to provide additional shielding at the cell level, thus inhibiting the flow of thermal energy from the cell undergoing thermal runaway to adjacent cells. Still yet another approach, disclosed in co-pending U.S. patent application Ser. No. 12/545,146, is to use a spacer assembly to maintain the position of the battery undergoing thermal runaway in its predetermined location within the battery pack, thereby helping to minimize the thermal effects on adjacent cells.

Accordingly, what is needed is a system that contains a thermal runaway incident to a group of cells within the battery pack in the event that the attempts to prevent the initial thermal runaway incident from occurring or its propagation to adjacent cells fails, thereby limiting the hazards associated with a cascading thermal runaway event. The present invention provides such a system.

SUMMARY OF THE INVENTION

The present invention uses one or more thermal barrier elements to divide the cells in a battery pack into groups. The thermal barrier elements that separate the cells into groups prevent a thermal runaway event initiated in one group of cells from propagating to the cells within a neighboring group of cells. As a result, battery pack damage as well as collateral damage and personnel hazards are minimized.

In at least one embodiment of the invention, a battery pack is provided, the battery pack comprised of an enclosure, a plurality of cells contained within the enclosure, and at least one thermal barrier element dividing the battery pack into a plurality of cell groups, each of which includes at least two cells. The thermal barrier element(s) prevents a thermal runaway event in one group of cells from initiating a second thermal runaway event in an adjacent group of cells. The thermal barrier element(s) is comprised of a material with a melting temperature of at least 300° C.; alternately, greater than 600° C.; alternately, greater than 1000° C.; alternately, greater than 1500° C. The thermal barrier element(s) may extend completely between adjoining battery pack enclosure walls; alternately, to at least 95 percent of the separation distance between adjoining enclosure walls, alternately, to at least 90 percent of the separation distance between adjoining enclosure walls. The thermal barrier element(s) may be comprised of a material with a thermal conductivity of less than 20 W/mK at 25° C.; alternately, of less than 1 W/mK at 25° C.; alternately, of less than 0.3 W/mK at 25° C. The thermal barrier element(s) may be comprised of a material selected from the group consisting of metals, metal alloys, aluminum oxide, magnesium oxide, silicon dioxide, silicon nitride, silicon carbide, alumina silicate, calcium-silicate, calcium-magnesium-silicate, aramid, silicone coated fiberglass, acrylic coated fiberglass, vermiculite coated fiberglass, graphite coated fiberglass, polytetrafluoroethylene coated fiberglass, or some combination thereof. At least one channel, configured to contain a heat transfer fluid, may be integrated into the thermal barrier element(s). The integrated channel(s) may be coupled to a heat sink; coupled to a passive cooling system that includes a coolant reservoir; or coupled to an active cooling system that includes a coolant reservoir and a coolant pump. The active cooling system may also include a heat exchanger. The thermal barrier element(s) may be comprised of a central region of a first component material sandwiched between layers of a second component material. The central region or the layers on either side of the central region may be coupled to a heat sink. The central region may be comprised of material with a thermal conductivity of less than 50 W/mK while the layers on either side of the central region may be comprised of a material with a thermal conductivity of greater than 50 W/mK; alternately, the central region may be comprised of material with a thermal conductivity of less than 10 W/mK while the layers on either side of the central region may be comprised of a material with a thermal conductivity of greater than 100 W/mK; alternately, the central region may be comprised of material with a thermal conductivity of greater than 50 W/mK while the layers on either side of the central region may be comprised of a material with a thermal conductivity of less than 50 W/mK; alternately, the central region may be comprised of material with a thermal conductivity of greater than 100 W/mK while the layers on either side of the central region may be comprised of a material with a thermal conductivity of less than 10 W/mK.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale. Accordingly, not all battery elements and/or battery pack elements are shown in the illustrations.

Figure 1:
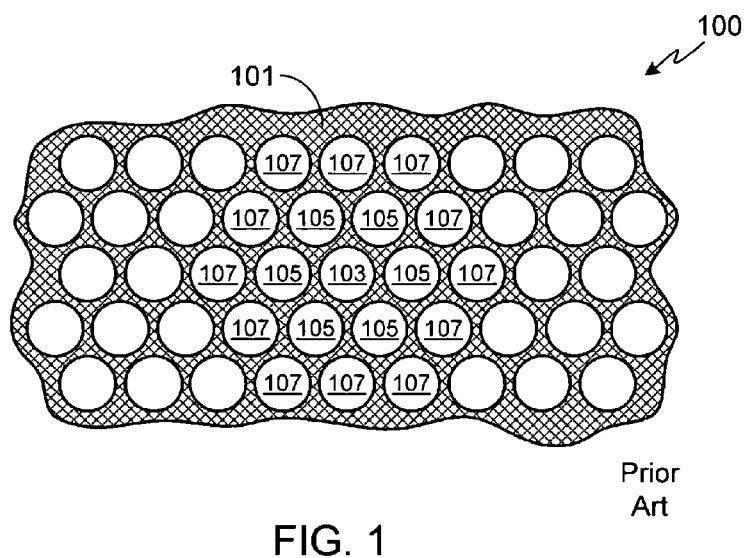
FIG. 1 provides a simplified top view of a portion of a conventional battery pack.

FIG. 1 is a simplified top view of a portion of a conventional battery pack 100. Although the batteries in this figure are shown as having a cylindrical form, for example utilizing the 18650 form-factor, it should be understood that the problems outlined below as well as the solutions offered by the present invention are equally applicable to both cylindrical batteries and those utilizing a different form-factor, e.g., pouch cells, rectangular cells, etc. It will also be appreciated that while FIG. 1 only shows a couple dozen cells, a battery pack may include hundreds or thousands of cells, for example those used in hybrid and all-electric vehicles. Typically battery pack 100 uses one or more brackets, such as illustrated bracket 101, to hold the cells in place. The bracket(s) may be integral to the battery pack housing, or only an internal component thereof.

In a conventional cell, such as those shown in FIG. 1, a variety of different abusive operating/charging conditions and/or manufacturing defects may cause the cell to enter into thermal runaway, where the amount of internally generated heat is greater than that which can be effectively withdrawn. As a result, a large amount of thermal energy is rapidly released, heating the entire cell up to a temperature of 900° C. or more and causing the formation of localized hot spots where the temperature may exceed 1500° C. Accompanying this energy release is the release of gas, causing the gas pressure within the cell to increase.

To combat the effects of thermal runaway, a conventional cell will typically include a venting element within the cap assembly. The purpose of the venting element is to release, in a somewhat controlled fashion, the gas generated during the thermal runaway event, thereby preventing the internal gas pressure of the cell from exceeding its predetermined operating range. While the venting element of a cell may prevent excessive internal pressure, this element may have little effect on the thermal aspects of a thermal runaway event. For example, if cell 103 of FIG. 1 undergoes thermal runaway, the thermal energy generated during this event may heat adjacent cells 105 to above the critical temperature of these cells, causing cells 105 to enter into thermal runaway. This, in turn, may heat adjacent cells 107 sufficiently to cause them to enter into thermal runaway. Thus the occurrence of a single cell undergoing thermal runaway can initiate a cascading reaction that can spread throughout the entire battery pack. As a result, a large amount of heat is generated which, assuming the battery pack is used in an electric vehicle or similar application, may be confined to a relatively small region in close proximity to the vehicle's driver and passengers. Accordingly, it is critical that measures are taken to contain the thermal runaway event to a small region of the battery pack.

In accordance with the present invention, the cells of a battery pack are divided into groups, the groups being separated by one or more thermal barrier elements. The thermal barrier element(s) separating the cell groups inhibit, if not altogether eliminate, the propagation of a thermal runaway event initiating in one group of cells to a neighboring group of cells. By significantly limiting the spread of thermal runaway, not only is damage to the battery pack minimized, but more importantly collateral damage to adjacent components as well as hazards to personnel in close proximity to the battery pack are minimized.

Figure 2:
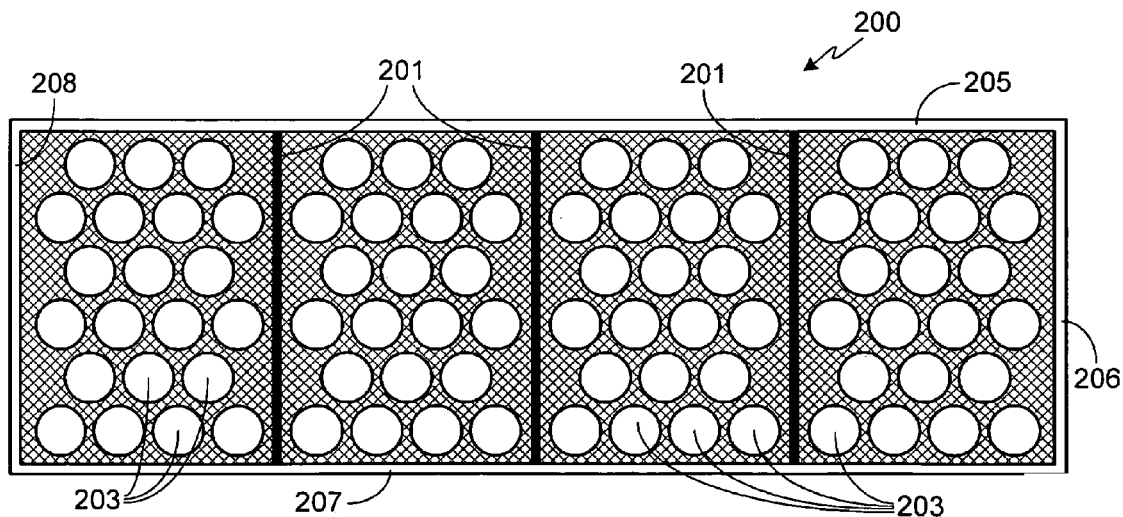
FIG. 2 provides a top view of a battery pack, similar to the conventional battery pack shown in FIG. 1, except for the inclusion of multiple barrier elements.
Figure 3:
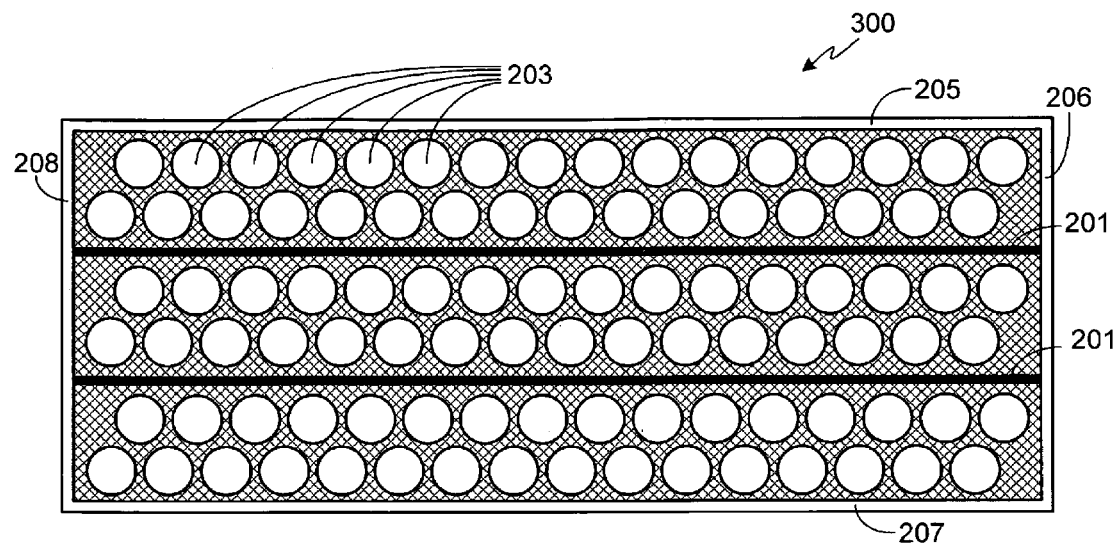
FIG. 3 provides a top view of a battery pack utilizing an alternate configuration of thermal barrier elements.
Figure 4:
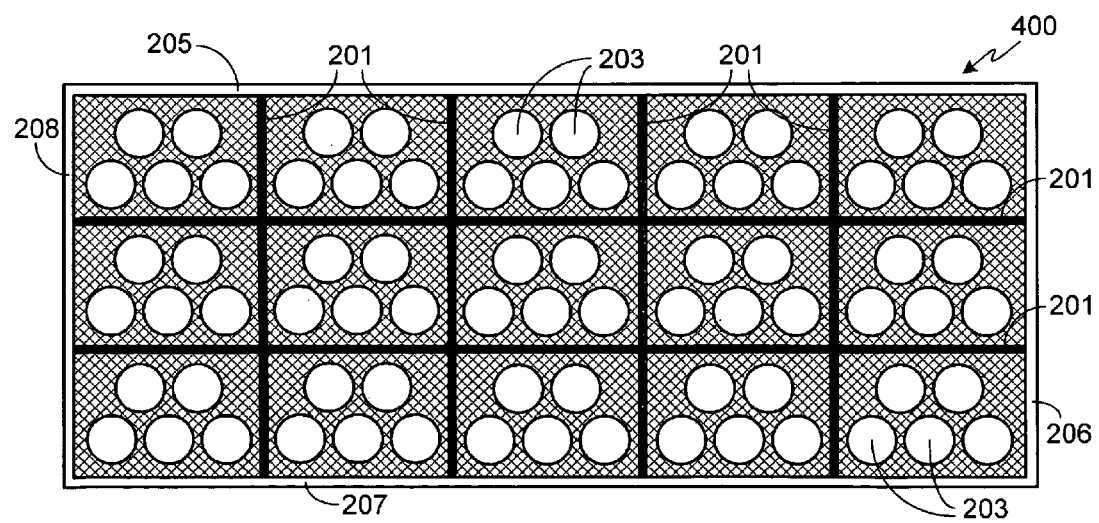
FIG. 4 provides a top view of a battery pack utilizing an alternate configuration of thermal barrier elements.
Figure 5:
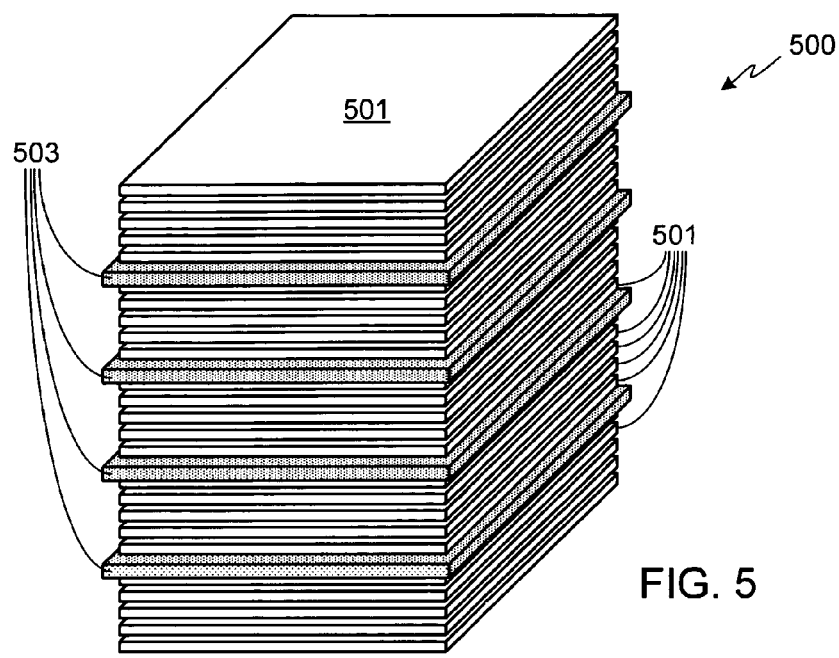
FIG. 5 is a perspective view of a battery pack comprised of pouch cells, the battery pack divided into five cell groups.

FIGS. 2-4 illustrate three different battery pack configurations, each of which includes multiple thermal barrier elements 201 to separate cells 203 into groups. Thermal barrier elements 201 prevent the propagation of a thermal runaway event that is initiated in one group of cells from propagating to cells in other cell groups. In the configurations illustrated in FIGS. 2-4, battery pack 200 is divided into four cell groups; battery pack 300 is divided into three cell groups; and battery pack 400 is divided into fifteen cell groups. It will be appreciated, however, that a battery pack in accordance with the invention can be divided into any number of cell groups, and that each cell group can include any number of cells from two or more. Additionally, while FIGS. 2-4 illustrate the invention applied to cylindrical cells, e.g., 18650 form-factor cells, the invention is equally applicable to other battery shapes. For example, FIG. 5 is a perspective view of a portion of a battery pack 500 utilizing rectangular, e.g., pouch, cells 501. As shown, battery pack 500 is divided into five cell groups by thermal barrier elements 503, each cell group including five cells 501.

Clearly the advantage of dividing the battery pack into more, rather than less, cell groups is the ability to stop the propagation of a thermal runaway event sooner, thereby incurring less cell and collateral damage. Unfortunately as the number of cell groups is increased, so is the number of thermal barrier elements. As a result, increasing the number of cell groups increases the weight and size of the battery pack. Therefore for each application the benefits of dividing the battery pack into more cell groups must be weighed against the weight and size constraints of the intended application.

Figure 6:
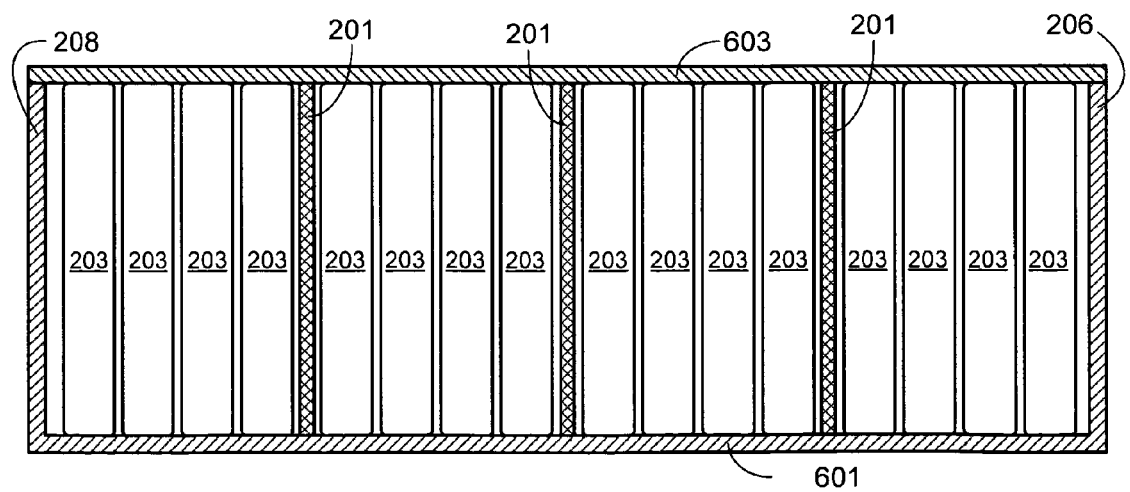
FIG. 6 is a cross-sectional view of the embodiment shown in FIG. 2.

As the effectiveness of the thermal barrier elements are based, in part, on the completeness of the thermal barrier that they comprise, preferably each barrier element extends completely between adjoining enclosure walls of the battery pack. This preferred design is illustrated in FIG. 2 in which thermal barrier elements 201 extend completely between adjoining enclosure walls 205 and 207; in FIG. 3 in which thermal barrier elements 201 extend completely between adjoining enclosure walls 206 and 208; and in FIG. 4 in which thermal barrier elements 201 extend completely between adjoining enclosure walls 205-208. Preferably, and as illustrated in the cross-sectional view of FIG. 2 shown in FIG. 6, thermal barrier elements 201 also extend completely between the lower enclosure wall 601 and the upper enclosure wall 603. Similarly, in the cross-sectional view of battery pack 500 shown in FIG. 7, thermal barrier elements 503 preferably extend from enclosure wall 701 to enclosure wall 703. Although not shown, it will be understood that in the preferred embodiment, thermal barrier elements 503 also extend completely between the other two enclosure walls. If the thermal barrier elements do not extend completely between adjoining enclosure walls, for example to allow pressure equalization between cell groups or to provide easy access for cooling conduits and battery interconnects, then preferably the thermal barrier elements extend at least 90 percent, and more preferably at least 95 percent, of the separation distance between adjoining enclosure walls. This aspect of the invention is illustrated in FIG. 8 which shows a modification of the cross-sectional view of FIG. 6. As shown, in this embodiment thermal barrier elements 201 do not extend completely to adjoining enclosure wall 603, instead leaving a gap 801. It will be appreciated that such a gap may separate other barrier element edges and other adjoining enclosure walls.

Figure 7:
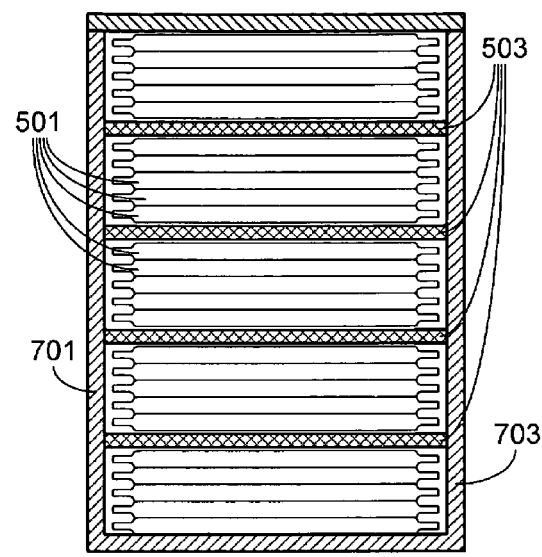
FIG. 7 is a cross-sectional view of the embodiment shown in FIG. 5.
Figure 8:
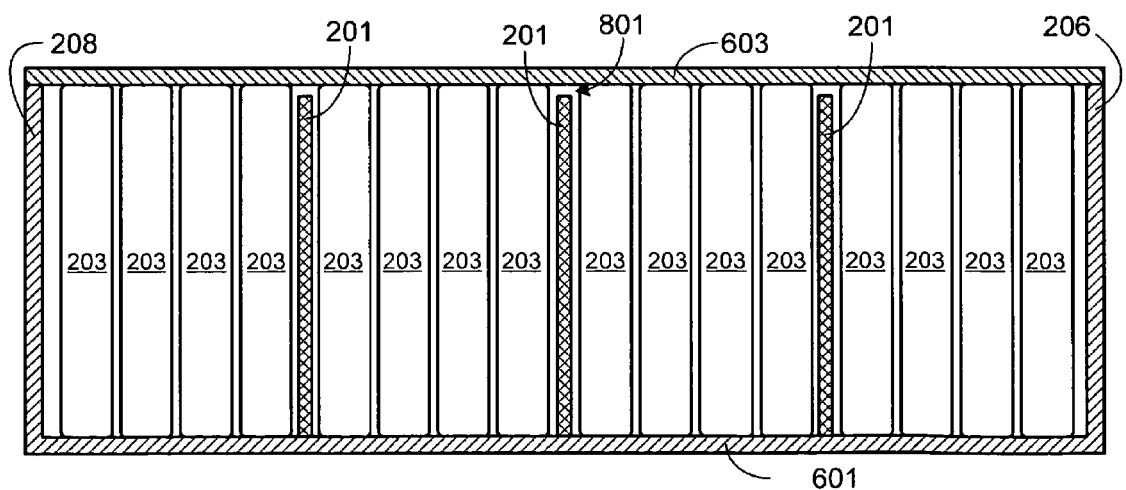
FIG. 8 illustrates a modification of the embodiment shown in FIG. 6.

In one embodiment of the invention, the thermal barrier elements, e.g., elements 201 in FIGS. 2-4, 6 and 8 and elements 503 in FIGS. 5 and 7, are comprised of a material with a high melting temperature. The use of such a material ensures that the barrier or barriers between cell groups remain intact while one or more cells in one group are undergoing thermal runaway. Preferably the barrier elements have a melting temperature of at least 300° C., more preferably of at least 600° C., still more preferably of at least 1000° C., and yet still more preferably of at least 1500° C. In addition to having a high melting temperature, in at least one embodiment the material comprising the thermal barrier elements also exhibits low thermal conductivity, preferably less than 20 W/mK, more preferably less than 1 W/mK, and still more preferably less than 0.3 W/mK (all measured at 25° C.). The use of a low thermal conductivity material helps to prevent the conduction of heat from the cell or cells in the group of cells undergoing thermal runaway through the barrier to an adjacent cell group. If only a high melting temperature material is desired, any of a variety of metals and metal alloys may be used for the thermal barrier elements. If, however, low thermal conductivity is required in addition to a high melting temperature, then preferably a ceramic or material with similar characteristics is used. Exemplary ceramic materials suitable for use with the invention include aluminum oxide (alumina), magnesium oxide (magnesia), silicon dioxide (silica), silicon nitride, silicon carbide (carborundum) and alumina silicate. Other suitable materials include calcium-silicate, calcium-magnesium-silicate, aramid, intumescent material, and coated fiberglass, e.g., fiberglass coated with silicone, acrylic, vermiculite, graphite, or polytetrafluoroethylene (PTFE).

Figure 9:
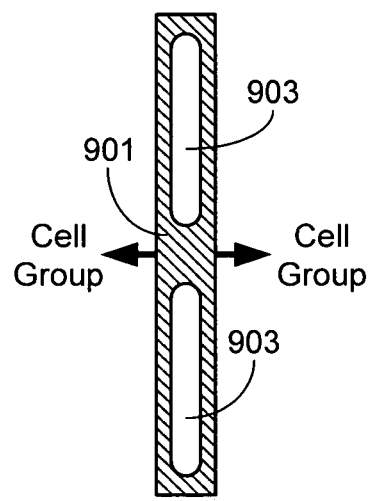
FIG. 9 is a cross-sectional view of a thermal barrier element that includes multiple coolant channels.

In an alternate preferred embodiment, in addition to providing a physical and thermal barrier, the thermal barrier elements may also be used to reduce the thermal load from the cell group undergoing thermal runaway, either by drawing thermal energy away or by absorbing it, thereby providing further shielding to the neighboring cell groups. This type of thermal barrier can be used with any of the previously disclosed battery pack configurations. In one configuration of such a thermal barrier element, illustrated in the cross-sectional view of FIG. 9, thermal barrier element 901 includes one or more channels 903. Within channel(s) 903 is a heat transfer fluid, for example water, a glycol-water mixture, or some other heat transfer fluid (e.g., coolant).

Figure 10:
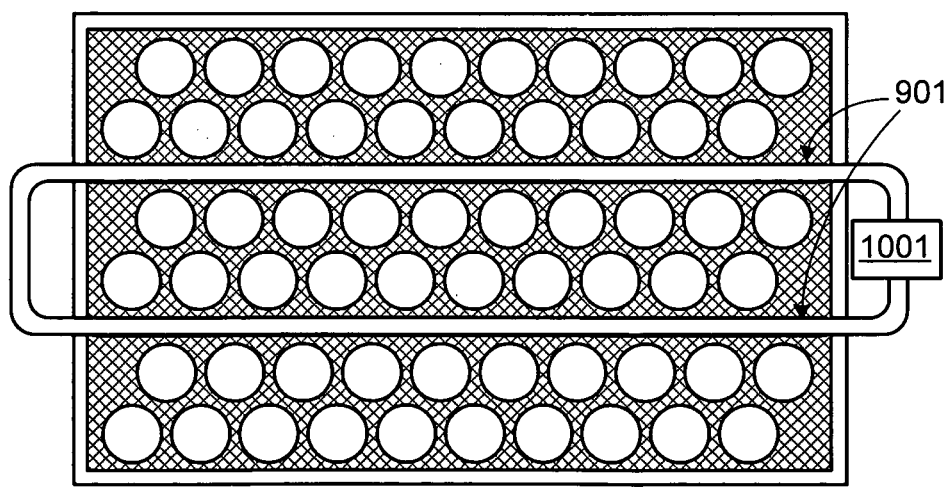
FIG. 10 schematically illustrates a passive coolant system coupled to the coolant channels of the thermal barrier elements.
Figure 11:
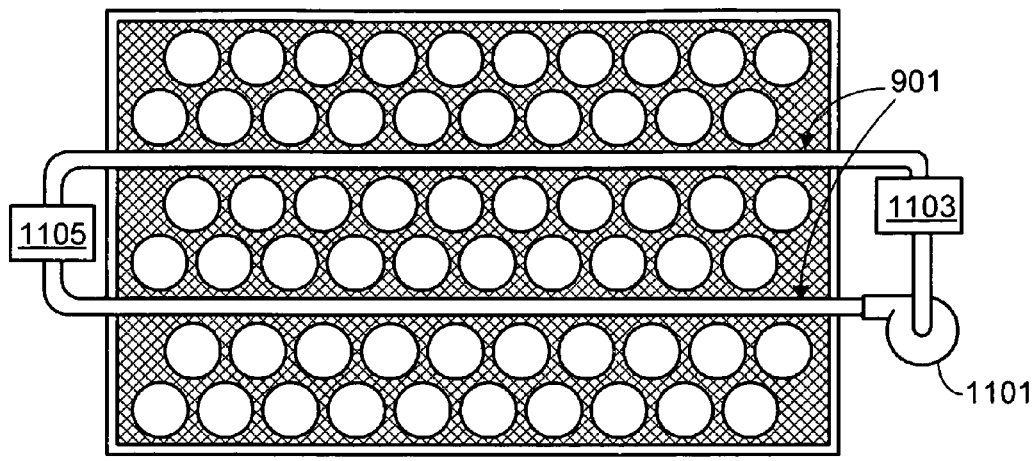
FIG. 11 schematically illustrates an active coolant system coupled to the coolant channels of the thermal barrier elements.

In one embodiment using thermal barrier element(s) 901, the channel or channels 903 within each thermal barrier element are sealed, i.e., self-contained within the thermal barrier element. Alternately, channel(s) 903 and the heat transfer fluid contained therein may be coupled to either a passive system or an active system. In a passive system, the thermal barrier elements may be independent from one another, i.e., the channels of the individual barrier elements may, be decoupled from one another. Alternately, and as illustrated in FIG. 10, the channels of different thermal barrier elements may be coupled to one another, thereby providing a larger heat sink and thus improved heat withdrawal capabilities. Preferably a heat transfer fluid reservoir 1001 is coupled to the barrier element channels as shown, thus providing a simple means of taking into account the expansion and contraction of the coolant as it changes temperature. In an active system, for example as illustrated in FIG. 11, the channels within the thermal barrier elements are coupled to a heat transfer fluid circulation system, thereby providing active removal and redistribution of the heat load generated by the cells undergoing thermal runaway. It will be appreciated that the heat transfer fluid circulation system coupled to the thermal barrier elements of the invention can either be in addition to another battery cooling system coupled to the battery pack, or it can serve dual purposes, i.e., both as a battery cooling system during normal operation and as a thermal runaway propagation control system. In the exemplary active configuration shown in FIG. 11, the channels within thermal barrier elements 901 are coupled via circulation conduits to a circulation pump 1101 and a heat transfer fluid reservoir 1103. The system may also be coupled to a heat exchanger 1105 as shown. An exemplary heat exchanger is a radiator. If a heat exchanger is used, it may be coupled to another thermal system, for example a conventional cooling system, i.e., one utilizing a condenser, a compressor, etc.

Figure 12:
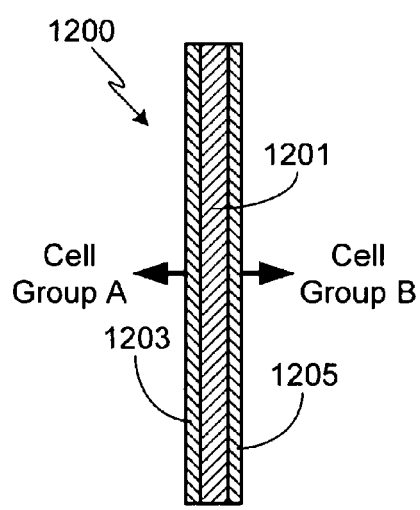
FIG. 12 is a cross-sectional view of a thermal barrier element that includes multiple layers.

In addition to single material thermal barrier elements, including those with integrated coolant channels, some embodiments of the present invention use multi-component barrier elements. The use of such a design allows the thermal barrier elements to efficiently redistribute the heat load arising from a cell group undergoing thermal runaway while simultaneously providing an effective thermal shield between adjacent cell groups. For example, in the cross-sectional view shown in FIG. 12, barrier element 1200 has a central region 1201 comprised of a low thermal conductivity material, i.e., with a thermal conductivity of less than 50 W/mK, more preferably less than 10 W/mK, and still more preferably less than 1 W/mK (all measured at 25° C.). Region 1201 is sandwiched between layers 1203 and 1205, each of which is comprised of a high thermal conductivity material, i.e., with a thermal conductivity of greater than 50 W/mK, more preferably greater than 100 W/mK, and still more preferably greater than 200 W/mK (all measured at 25° C.). In an exemplary thermal runaway situation in which one or more cells in group "A" (FIG. 12) are undergoing thermal runaway, the high thermal conductivity layer 1203 immediately adjacent to cell group "A" redistributes the generated thermal energy. Then central region 1201 minimizes the transfer of heat between layers 1203 and 1205, and thus between cell groups "A" and "B". The thermal energy that is transferred from layer 1203 to layer 1205 is redistributed by layer 1205, thus preventing the formation of localized hot spots in the barrier and minimizing the adverse effects on the cells in group "B" that are adjacent to barrier 1200.

Figure 13:
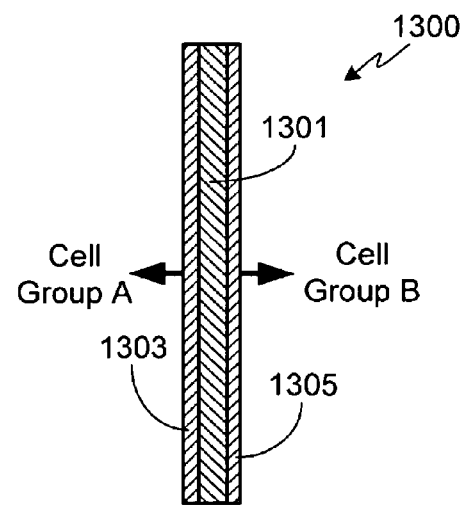
FIG. 13 is a cross-sectional view of a thermal barrier element utilizing an alternate arrangement of layers.

In a variation of multi-component thermal barrier element 1200, element 1300 shown in the cross-sectional view of FIG. 13 includes a central region 1301 comprised of a high thermal conductivity material, i.e., with a thermal conductivity of greater than 50 W/mK, more preferably greater than 100 W/mK, and still more preferably greater than 200 W/mK (all measured at 25° C.). Region 1301 is sandwiched between layers 1303 and 1305, each of which is comprised of a low thermal conductivity material, i.e., with a thermal conductivity of less than 50 W/mK, more preferably less than 10 W/mK, and still more preferably less than 1 W/mK (all measured at 25° C.). In an exemplary thermal runaway situation in which one or more cells in group "A" (FIG. 13) are undergoing thermal runaway, the low thermal conductivity layer 1303 immediately adjacent to cell group "A" minimizes the transfer of thermal energy between cell group "A" and central barrier region 1301. The thermal energy that does pass through layer 1303 is redistributed by central region 1301, thereby minimizing the formation of localized hot spots in the barrier. Finally, layer 1305 minimizes the transfer of the distributed thermal energy in region 1301 to the cells in group "B".

Figure 14:
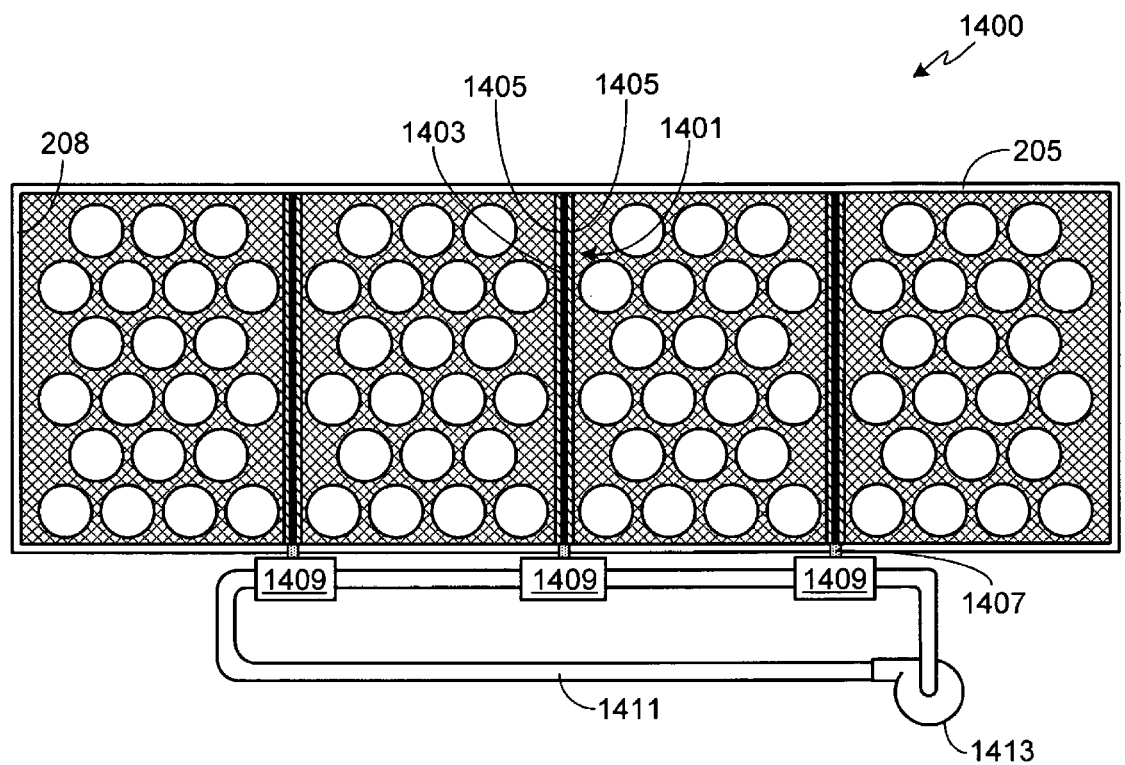
FIG. 14 schematically illustrates an embodiment in which the high thermal conductivity layer of the thermal barrier elements is coupled to a heat sink.

To aid in the distribution and removal of thermal energy by either a barrier or barrier layer comprised of high thermal conductivity material, in at least one embodiment the high thermal conductivity barrier/barrier layer is coupled to a heat sink. It will be appreciated that there are a variety of heat sink types and configurations, as well as different techniques for coupling the heat sink to the thermally conductive barrier/barrier layer, and that the present invention is not limited to the use of any one type of heat sink/coupling technique. An exemplary embodiment of a system in accordance with the invention coupled to a heat sink is shown in FIG. 14. In battery pack 1400, each thermal barrier element 1401 is comprised of a central high thermal conductivity layer 1403 sandwiched between two layers 1405 of low thermal conductivity material as previously described relative to barrier 1300. The high thermal conductivity layer 1403 of each barrier element 1401 is coupled, via a heat pipe 1407, to a heat sink 1409 in the form of a cooling block. Although each cooling 1409 may be separate and independent from one another, in the illustrated embodiment cooling blocks 1409 are coupled to a coolant circulation pipe 1411. A coolant circulation pump 1413 circulates coolant (e.g., heat transfer fluid) through pipe 1411 and cooling blocks 1409. This coolant circulation system may be an independent cooling system as shown; or coupled, for example using a heat exchanger, to another cooling system; or may comprise a portion of another cooling system.

It will be appreciated that there are a variety of techniques that can be used to fabricate the thermal barrier elements, the preferred approach depending, at least in part, on the desired composition of the barrier element. Additionally, the preferred fabrication technique depends on whether the thermal barrier element is a single or multi-component element, and whether the barrier element includes integrating coolant channels. Exemplary fabrication techniques include molding, die cutting, machining, vacuum-forming, and injection molding.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack, comprising:
   a multi-sided battery pack enclosure comprising first and second battery pack enclosure walls and upper and lower battery pack enclosure walls;
   a plurality of cells completely contained within said battery pack enclosure; and
   at least one thermal barrier element dividing the battery pack into a plurality of cell groups, wherein said at least one thermal barrier element extends completely between said first and second battery pack enclosure walls, wherein said at least one thermal barrier element extends completely between said upper and lower battery pack enclosure walls, wherein each cell group of said plurality of cells groups is completely segregated from other cell groups of said plurality of cell groups by said at least one thermal barrier element, wherein each of said plurality of cell groups includes at least two cells, wherein each of said at least one thermal barrier elements is comprised of a central portion sandwiched between a pair of layers, wherein said central portion exhibits a high thermal conductivity and each layer of said pair of layers is comprised of a low thermal conductivity material with a melting temperature of at least 300° C. and a thermal conductivity of less than 20 W/mK at 25° C., and wherein each of said at least one thermal barrier elements prevents a thermal runaway event in a first cell group of said plurality of cell groups from initiating a second thermal runaway event in an adjacent cell group of said plurality of cell groups.

2. The battery pack of claim 1, wherein said melting temperature of said low thermal conductivity material comprising each layer of said pair of layers comprising said at least one thermal barrier elements is greater than 600° C.

3. The battery pack of claim 1, wherein said melting temperature of said low thermal conductivity material comprising each layer of said pair of layers comprising said at least one thermal barrier elements is greater than 1500° C.

4. The battery pack of claim 1, wherein said low thermal conductivity material comprising each layer of said pair of layers comprising said at least one thermal barrier elements has a thermal conductivity of less than 1 W/mK at 25° C.

5. The battery pack of claim 1, wherein said low thermal conductivity material comprising each layer of said pair of layers comprising said at least one thermal barrier elements has a thermal conductivity of less than 0.3 W/mK at 25° C.

6. The battery pack of claim 1, wherein said low thermal conductivity material comprising each layer of said pair of layers comprising said at least one thermal barrier elements is selected from the group consisting of aluminum oxide, magnesium oxide, silicon dioxide, silicon nitride, silicon carbide, alumina silicate, calcium-silicate, calcium-magnesium-silicate, aramid, intumescent materials, silicone coated fiberglass, acrylic coated fiberglass, vermiculite coated fiberglass, graphite coated fiberglass, polytetrafluoroethylene coated fiberglass, or some combination thereof.

7. The battery pack of claim 1, wherein said central portion of each of said at least one thermal barrier elements further comprises at least one channel configured to contain a heat transfer fluid, wherein said at least one channel is integrated within said central portion of each of said at least one thermal barrier elements.

8. The battery pack of claim 7, wherein each of said at least one channels is coupled to a passive cooling system, and wherein said passive cooling system further comprises a coolant reservoir.

9. The battery pack of claim 7, wherein each of said at least one channels is coupled to an active cooling system, and wherein said active cooling system further comprises a coolant reservoir and a coolant pump.

10. The battery pack of claim 9, wherein said active cooling system further comprises a heat exchanger.

11. The battery pack of claim 7, wherein each of said at least one channels is coupled to a heat sink.

12. The battery pack of claim 1, wherein said high thermal conductivity of said central portion of each of said at least one thermal barrier elements is greater than 50 W/mK.

13. The battery pack of claim 12, wherein said high thermal conductivity of said central portion is greater than 100 W/mK and said thermal conductivity of said low thermal conductivity material comprising each layer of said pair of layers is less than 1 W/mK.

14. The battery pack of claim 1, wherein said central portion of each of said at least one thermal barrier elements is coupled to a heat sink.

* * * * *